United States Patent
Kim et al.

(10) Patent No.: US 8,429,991 B2
(45) Date of Patent: Apr. 30, 2013

(54) RACK BUSH AND RACK PINION TYPE STEERING APPARATUS HAVING RACK BUSH FOR VEHICLE

(75) Inventors: Heung-ju Kim, Wonju-si (KR);
Sung-moo Heo, Wonju-si (KR);
Byung-yun Choi, Wonju-si (KR)

(73) Assignee: Mando Corporation, Gyeonggi-do (KR)

( * ) Notice: Subject to any disclaimer, the term of this patent is extended or adjusted under 35 U.S.C. 154(b) by 455 days.

(21) Appl. No.: 12/753,338

(22) Filed: Apr. 2, 2010

(65) Prior Publication Data
US 2010/0251839 A1    Oct. 7, 2010

(30) Foreign Application Priority Data
Apr. 3, 2009 (KR) .......................... 10-2009-0028769

(51) Int. Cl.
*B62D 5/06* (2006.01)
*F16C 23/04* (2006.01)

(52) U.S. Cl.
USPC ......... 74/89.17; 74/388 PS; 74/422; 180/427; 384/37

(58) Field of Classification Search .................... 74/422, 74/388 PS, 89.17; 384/215, 267, 296, 37; 180/427
See application file for complete search history.

(56) References Cited

U.S. PATENT DOCUMENTS

| 620,664 | A | * | 3/1899 | Nissim | 24/17 B |
| 7,220,056 | B2 | * | 5/2007 | Kubota et al. | 384/215 |
| 7,665,747 | B2 | * | 2/2010 | Arlt | 280/93.514 |
| 7,798,504 | B2 | * | 9/2010 | Hirose et al. | 280/93.514 |

FOREIGN PATENT DOCUMENTS
JP    2004-314853    * 11/2004

* cited by examiner

*Primary Examiner* — William C Joyce
(74) *Attorney, Agent, or Firm* — McDermott Will & Emery LLP

(57) ABSTRACT

Disclosed is a rack bush and a rack pinion type steering apparatus having the rack bush for a vehicle, which can smoothly support a load in an axial direction and a vertical direction of a rack bar so that it is possible to reduce abnormal abrasion of the rack bush, reduce a rattle noise caused by external force transferred through the rack bar during movement of the rack bar, and prevent damage to the rack bar and a pinion through distribution of the load due to an external impact on the shaft.

20 Claims, 5 Drawing Sheets

RACK BUSH AND RACK PINION TYPE STEERING APPARATUS HAVING RACK BUSH FOR VEHICLE

BACKGROUND OF THE INVENTION

1. Field of the Invention

The present invention relates to a rack bush and a rack pinion type steering apparatus having the rack bush for a vehicle. More particularly, the present invention relates to a rack bush and a rack pinion type steering apparatus having the rack bush for a vehicle, which can smoothly support a load in an axial direction and a vertical direction of a rack bar so that it is possible to reduce abnormal abrasion of the rack bush, reduce a rattle noise caused by external force transferred through the rack bar during movement of the rack bar, and prevent damage to the rack bar and a pinion through distribution of the load due to an external impact on the shaft.

2. Description of the Prior Art

A steering apparatus is generally equipped between a driver's seat and wheels for moving the wheels by a driver. The steering apparatus includes a steering shaft located in a lower side of the steering wheel of the driver's seat, a gear box connected with the steering shaft, and a rack bar connected to wheels while extending in a left and right direction so as to directly operate the wheels according to an operation of the gear box.

FIG. 1 is a partial cross-sectional view illustrating a rack pinion type steering apparatus for a vehicle according to a prior art.

As illustrated in FIG. 1, a gear box 125 that is connected with a rack housing 137 in a side direction is provided at a lower side of a steering wheel 110 and a steering shaft 115.

The gear box 125 includes an input shaft 120 on an internal upper side of the gear box 125, in which the input shaft 120 is connected to the steering shaft 115 to receive rotational force generated in the steering wheel 110.

The gear box 125 includes a pinion (not shown) provided at an internal lower side of the gear box 125, in which the pinion (not shown) rotates by the rotational force transferred through the input shaft 120 and has teeth in an outer peripheral portion of its end. Further, the gear box 125 includes the rack housing 137 at a lower outer side of the gear box 125, in which the rack housing 137 is integrally formed with the gear box 125 and extending in both side directions.

The rack housing 137 is a hollow pipe and has opened entrances in both sides. Further, the rack housing 137 includes a rack bush 160 and a rack stopper 165 at one side of the opened entrance and a bellows 150 at an outer peripheral side of the rack housing 137.

The rack housing 137 includes a rack bar 140 having a rack at a center of the rack bar 140 in an inner side of the rack housing 137, so that the rack bar 140 can be teeth-assembled with a pinion formed in the gear box 125.

The rack bar 140 linearly moves in an axial direction in an inner side of the rack housing 137, and includes a rack at a center of the rack bar 140 so that the rack bar 140 can be teeth-assembled with the pinion of the gear box 125. A left side and a right side of the rack bar 140 is connected with a tie rod 155 through an inner ball joint of which a ball is inserted into and assembled with a ball housing 175, thereby steering the wheels.

In the meantime, the rack bush 160 is provided at one opened side of the rack housing 137 so as to support the rack bar 140 and guide the movement of the rack bar 140.

The rack bush 160 is shaped like a hollow pipe, of which an outer peripheral surface is in contact with and fixed to an inner peripheral surface and a stepped portion 135 of the rack housing 137 and an inner peripheral surface is in contact with an outer peripheral surface of the inserted rack bar 140, to guide the sliding of the rack bar 140. A rack stopper 165 is pressed into the rack housing 137 at the other end of the rack bush 160.

That is, the rack stopper 165 is installed at the end of the rack bush 160, in which the rack stopper 165 shaped like a hollow pipe is in contact with the rack bush 160 so as to seal the rack housing 137 and fixed to the inner peripheral surface of the rack housing 137, thereby preventing the rack bush 160 from being separated.

The rack bush and the rack pinion type steering apparatus having the rack bush for a vehicle according to the prior art has a problem in that the load in an axial direction and a vertical direction of the rack bar is transferred to the rack bush through the rack bar, the rack bush, and the rack housing during the steering of the steering wheel of the driver, so that abnormal abrasion and noise in the rack bush are generated.

Further, the rack bush fails to smoothly support the load in an axial direction and a vertical direction of the rack bar so that the rack bar and the pinion shaft are damaged due to the impact transferred from the outside through a road surface.

SUMMARY OF THE INVENTION

Accordingly, the present invention has been made to solve the above-mentioned problems occurring in the prior art, and the present invention provides a rack bush and a rack pinion type steering apparatus having the rack bush for a vehicle, which can smoothly support a load in an axial direction and a vertical direction of a rack bar so that it is possible to reduce abnormal abrasion of the rack bush, reduce a rattle noise caused by external force transferred through the rack bar during movement of the rack bar, and prevent damage to the rack bar and a pinion through distribution of the load due to an external impact on the shaft.

In accordance with an aspect of the present invention, there is provided a rack bush, including: a bush body shaped like a hollow pipe, of which an outer peripheral surface is assembled with an inner side of a rack housing and an inner peripheral surface is assembled with a rack bar, the bush body including at least one stepped portion, by which the outer peripheral surface of the bush body has multiple outer diameters decreasing from one side end to another side end, so that the bush body is supported by the rack bar and the rack housing and maintains rigidity, at least one first slit formed by incising said one side end in an axial direction, and at least one second slit formed by incising said another side end in the axial direction and being spaced apart from the first slit, said at least one first slit and said at least one second slit being misaligned to each other; and an elastic member having an annular shape and being in close contact with the outer peripheral surface of the bush body.

In accordance with another aspect of the present invention, there is provided a rack pinion type steering apparatus for a vehicle, including: a rack housing assembled with a rack bush at an inner side of the rack housing; and a rack bar supported by an inner peripheral surface of the rack bush to reciprocate in the rack housing, in which the rack bush includes: a bush body shaped like a hollow pipe, of which an outer peripheral surface is assembled with an inner side of a rack housing and an inner peripheral surface is assembled with a rack bar, the bush body including at least one stepped portion, by which the outer peripheral surface of the bush body has multiple outer diameters decreasing from one side end to another side end, so that the bush body is supported by the rack bar and the rack housing and maintains rigidity, at least one first slit formed by incising said one side end in an axial direction, and at least one second slit formed by incising said another side end in the axial direction and being spaced apart from the first slit, said at least one first slit and said at least one second slit being misaligned to each other; and an elastic member having an annular shape and being in contact with the outer peripheral surface of the bush body.

Accordingly, there is an effect in that the rack bush and the rack pinion type steering apparatus having the rack bush for a vehicle according to the present invention can smoothly support the load in an axial direction and a vertical direction of a rack bar so that it is possible to reduce abnormal abrasion of the rack bush, reduce a rattle noise caused by external force transferred through the rack bar during movement of the rack bar, and prevent damage to the rack bar and the pinion through distribution of the load due to an external impact on the shaft.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
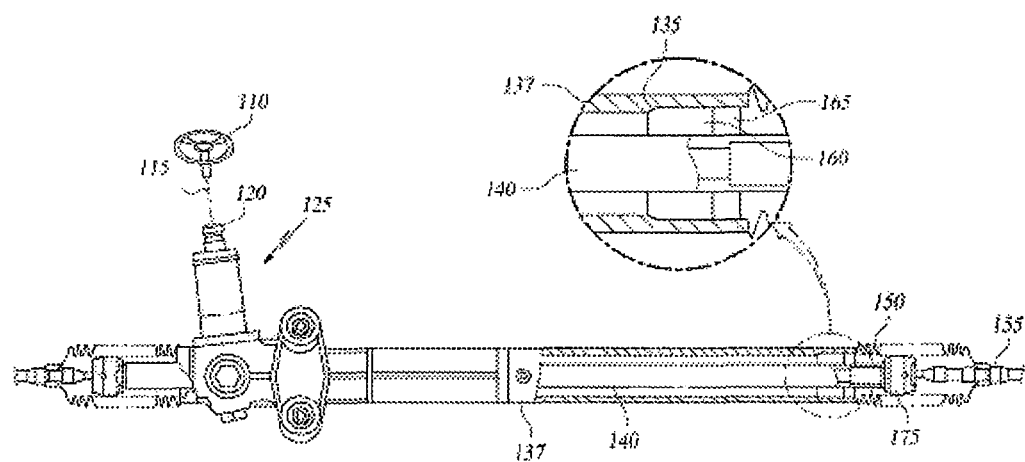
FIG. 1 is a partial cross-sectional view illustrating a rack pinion type steering apparatus for a vehicle according to the prior art.

Hereinafter, preferred embodiments of the present invention will be described with reference to the accompanying drawings. In the following description, the same elements will be designated by the same reference numerals although they are shown in different drawings. In the following description, detailed explanation of known related functions and constitutions may be omitted to avoid unnecessarily obscuring the subject manner of the present invention.

Further, a term of a first, a second, A, B, (a), (b), and the like may be used for describing a constructional element of the present invention. Such a term is only for discriminating the corresponding constructional element from another constructional element, but does not limit a nature, a sequence, or an order of the corresponding constructional element. If it is described that a constructional element is "linked", "assembled", or "connected" with another constructional element, the constructional element may be directly linked or connected to another constructional element, but it will be additionally appreciated that another constructional element can be further "linked", "assembled", or "connected" between each of the constructional elements.

Figure 2:
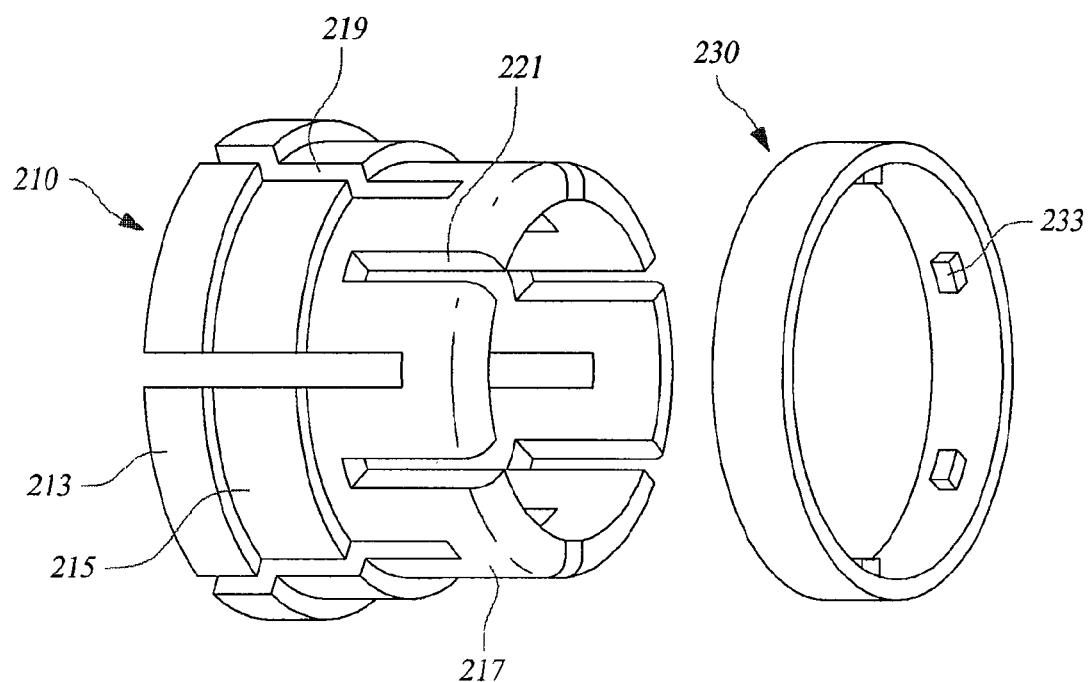
FIG. 2 is an exploded perspective view illustrating a rack bush according to a first embodiment of the present invention.
Figure 3:
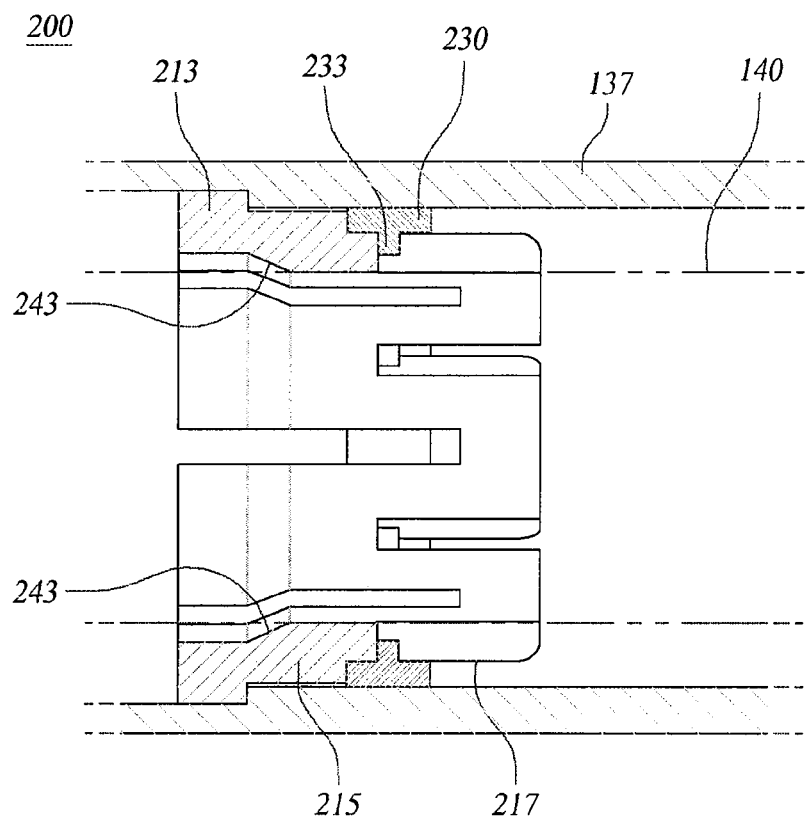
FIG. 3 is a cross-sectional view illustrating a rack bush according to a first embodiment of the present invention.
Figure 4:
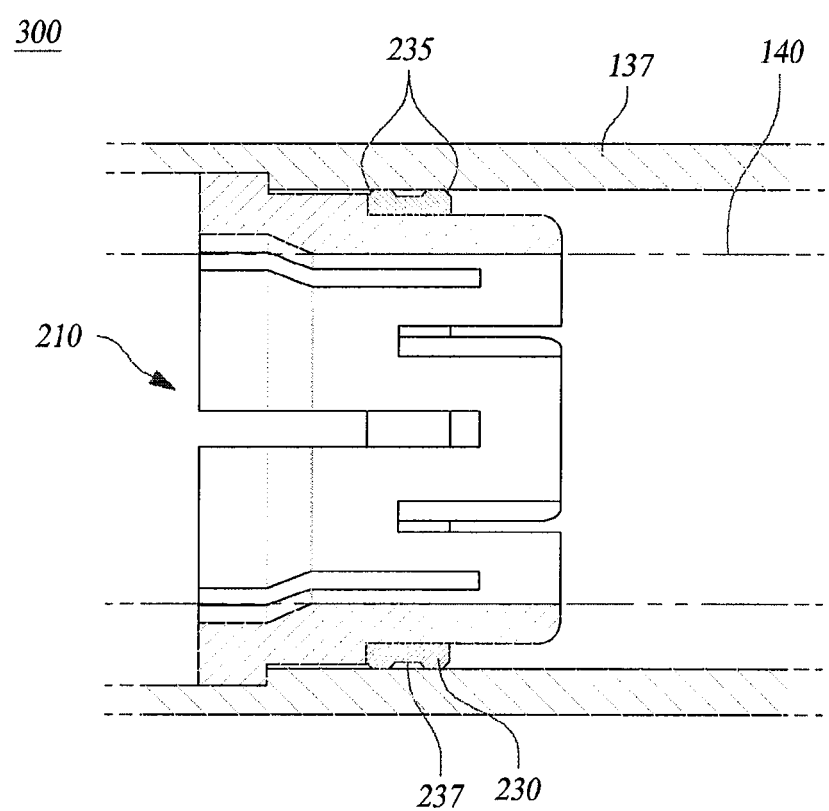
FIG. 4 is a cross-sectional view illustrating a rack bush according to a second embodiment of the present invention.
Figure 5:
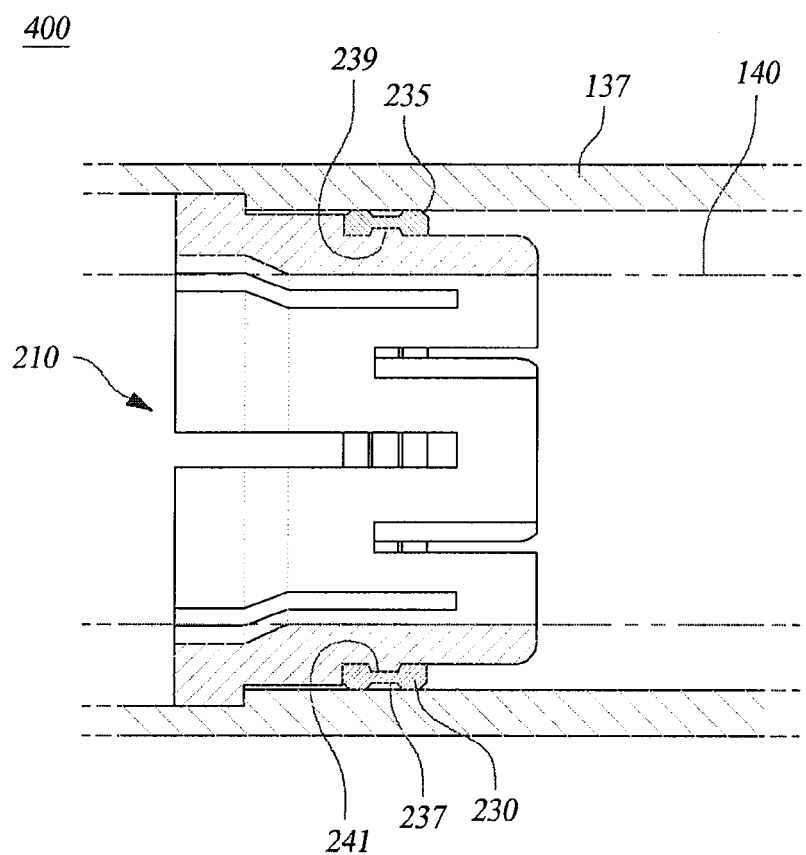
FIG. 5 is a cross-sectional view illustrating a rack bush according to a third embodiment of the present invention.

FIG. 2 is an exploded perspective view illustrating a rack bush according to a first embodiment of the present invention, FIG. 3 is a cross-sectional view illustrating a rack bush according to a first embodiment of the present invention, FIG. 4 is a cross-sectional view illustrating a rack bush according to a second embodiment of the present invention, and FIG. 5 is a cross-sectional view illustrating a rack bush according to a third embodiment of the present invention.

As illustrated in FIGS. 2 and 3, a rack bush 200 according to a first embodiment of the present invention is shaped like a hollow pipe, of which an outer peripheral surface is assembled with an inner surface of a rack housing 137 and an inner peripheral surface is assembled with a rack bar 140. The rack bush 200 includes a bush body 210 that includes at least one stepped portion, by which the outer peripheral surface of the bush body has multiple outer diameters decreasing from one side end to the other side end of the rack bush 200, so that the bush body 210 can be supported by the rack bar 140 and the rack housing 137 and maintains its rigidity, at least one first slit 219 formed by incising of the one side end in an axial direction of the rack bush 200, and at least one second slit 221 formed by incising the other side end in an axial direction and being spaced apart from the first slit 221, said at least one first slit 219 and said at least one second slit 221 being misaligned to each other, and an elastic member 230 that has an annular shape and is in contact and assembled with an outer peripheral surface of the bush body 210.

The stepped portion of the bush body 210 includes a large diameter portion 213 assembled with and supported by the rack housing 137 and a small diameter portion 217 assembled with the outer peripheral surface of the elastic member 230. Otherwise, the stepped portion of the bush body 210 includes a large diameter portion 213 assembled with and supported by the rack housing 137, a middle diameter portion 215, which has stepped outer diameters decreasing from the large diameter portion 213, and a small diameter portion 217, which has stepped outer diameters decreasing from the middle diameter portion 215 and an outer peripheral surface assembled with the elastic member 230.

The rack bar 140 converts the rotation movement of the steering shaft into the linear movement and reciprocates in the rack housing 137 in an axial direction. Left and right ends of the rack bar 140 are connected with a tie rod (reference number 155 of FIG. 1) through an inner ball joint of which a ball is inserted into and assembled with a ball housing (reference number 175 of FIG. 1), to steer the wheels.

The rack bar 140 that is teeth-assembled with a pinion of the steering shaft linearly reciprocates in a left and right direction within the rack housing 137 during the steering of the steering wheel of the driver.

At this time, the rack bar 140 is supported by the rack bush 200 that is assembled with the inner side of the rack housing 137, to linearly reciprocate. The rack bush 200 according to the first embodiment of the present invention includes the first slit 219 and the second slit 221 on the large diameter portion 213 and the small diameter portion 217 or the large diameter portion 213, the middle diameter portion 215, and the small diameter portion 217, which have stepped outer diameters, so that the rack bush 200 elastically deforms, i.e. shrinks and releases, by itself with those slits or elastically deforms, i.e. shrinks and releases, between the rack housing 137 and the rack bar 140 by elastic force of the elastic member 230 assembled with the small diameter portion 217. Therefore, impact energy transferred through the rack bar 140 decreases so that the noise is decreased, and the rack bush 200 is in contact with the rack bar 140 so that it is possible to prevent the noise caused by clearance between the rack bar 140 and the rack bush 200.

The bush body 210 is in contact with the rack bar 140 and the rack housing 137 to slide so that it is preferable that the bush body 210 is made from a material having abrasion resistance, low friction property, predetermined flexure and rigidity, and low elastic property against heat, such as a material including an engineering plastic base material including Poly Acetal (Poly Oxy Methylene, POM), Polyamide (PA), Polycarbonate (PC), Polyimide (PI), Poly Butylene Terephthalate (PBT), natural rubber, or a synthetic resin including Polyester Elastomer (PE).

The rack bush 200 according to the first embodiment of the present invention is shaped like a hollow pipe so that the rack bush 200 is assembled with an inner side of the rack housing 137 and the rack bar 140 is inserted into the inner peripheral surface of the rack bush 200, thereby enabling the rack bar 140 to linearly move.

The bush body 210 includes the stepped portion having the stepped outer diameter of the outer peripheral surface of the bush body 210, so that the bush body 210 is supported by the rack bar 140 and the rack housing 137 and maintains its rigidity. The stepped portion includes the large diameter portion 213 and the small diameter portion 217, or the large diameter portion 213, the middle diameter portion 215, and the small diameter portion 217.

The large diameter portion 213 is supported by the stepped portion 135 of the rack housing 137 so that the rack bush 200 is fixed to the rack housing 137 without interworking of the rack bush 200 with the rack bar 140 during the linear movement of the rack bar 140. Further, one side of the elastic member 230 that is assembled with the small diameter portion 217 is supported by the stepped portion between the large diameter portion 213 and the small diameter portion 217 or the stepped portion between the middle diameter portion 215 and the small diameter portion 217 so that the rack bush 200 can be assembled with the rack housing 137 without skidding.

Further, the bush body 210 has the stepped outer peripheral surface decreasing from the large diameter portion 213 to the small diameter portion 217 so that the bush body 210 can easily elastically deform in a diameter direction of the bush body 210 while maintaining the entire rigidity of the bush body 210.

Further, in the bush body 210, the outer peripheral surfaces of the stepped portion of the large diameter portion 213 and the small diameter portion 217 or the outer peripheral surface of the stepped portion of the middle diameter portion 215 and the small diameter portion 217 are slantingly connected, so that the elastic member 230 can make the bush body 210 be in contact with the rack bar 140 and the rack housing 137 by the elastic force while moving from the small diameter portion 217 to the middle diameter portion 215 or from the small diameter portion 217 to the large diameter portion 213 during the linear movement of the rack bar 140.

The bush body 210 includes an enlarged diameter portion 243 having an inner diameter increasing from the middle diameter portion 215 to the large diameter portion 213 in the inner peripheral surface of the bush body 210 in such a manner that the bush body 210 can be easily assembled with the rack bar 140 and prevent the increase of the sliding resistance of the rack bar 140 and the rack bush 200 even if the bending deformation is generated due to the manufacturing or durability progressing of the rack bar 140.

Further, the bush body 210 includes the first slit 219 and the second slit 221 formed by incising the outer peripheral surface and the inner peripheral surface in the axial direction, respectively, so that the bush body 210 itself has the elastic force capable of shrinking and releasing when the rack bush 200 is assembled with the rack housing 137.

The first slit 219 is formed by incising the end of the large diameter portion 213 in the axial direction and the second slit 221 is formed by incising the end of the small diameter portion 217 in the axial direction, in which the first slit 219 and the second slit 221 have the opening ends in the opposite direction.

That is, the first slit 219 is formed by incising the end from the large diameter portion 213 to the partial small diameter portion 217 in the axial direction so that it is opened in a direction of the end of the large diameter portion 213, and the second slit 221 is formed by partially incising the small diameter portion 217 in the axial direction while leaving a part of the small diameter portion 217 so that the second slit is opened toward the small diameter portion 217.

Further, the first slit 219 and the second slit 221 are alternately located in a circumferential direction while being spaced apart from each other so that it is possible to easily elastically deform the bush body 210 in a diameter direction and a protrusion 233 of the elastic body 230 to be described later is inserted into the first slit 219 and the second slit 221.

In the meantime, the bush body 210 is assembled with the elastic member 230 in the outer peripheral surface of the bush body 210, in which the elastic member 230 is coupled between the bush body 210 and the rack housing 137 and is elastically deformed so that it makes the bush body 210 shrink and the rack bar 140 come into contact with the rack bush 210, thereby decreasing the rattle noise.

The elastic member 230 has an annular shape in which the inner diameter of the elastic member 230 is smaller than the outer diameter of the bush body 210 and the width in the axial direction of the elastic member 230 is larger than a thickness in a diameter direction of the elastic member 230. Further, the elastic member 230 is made from an elastic material, such as urethane, natural rubber, or Polyester Elastomer (PE). One side of the elastic member 230 is supported by the large diameter portion 213 or the middle diameter portion 215 and is in contact with the outer peripheral surface of the small diameter portion 217.

Therefore, when the rack bush 200 is assembled with the rack housing 137, the elastic member 230 assembled with the small diameter portion 217 does not skid any more.

The elastic member 230 has the protrusion 233 that is inserted to the first slit 219 or the second slit 221 on the inner peripheral surface of the elastic member 230 so that the protrusion 233 guides the assembling of the elastic member 230 with the bush body 210 and prevents the elastic member 230 from rotating or being separated from the bush body 210 during the sliding of the rack bar 140.

Further, as illustrated in FIG. 4, the rack bush 300 according to a second embodiment of the present invention includes the elastic member 230 that includes an outer diameter groove 237 formed at a center of the outer peripheral surface in a diameter direction and inclined surfaces 235 formed at both ends of the outer peripheral surface.

Therefore, it is possible to reduce an area where the elastic member 230 is in contact with the inner peripheral surface of the rack housing 137 and improve the rigidity of the elastic member 230, so that it is possible to prevent the elastic member 230 from being caught in the rack housing 137 during the assembling of the bush body 210 with the rack housing 137.

Additionally, as illustrated in FIG. 5, the rack bush 400 according to a third embodiment of the present invention includes the elastic member 230 including an inner diameter groove 241 formed at the inner peripheral surface, an outer diameter groove 237 formed at the outer peripheral surface of the elastic member 230, and the inclined surfaces 235 formed at both ends of the outer peripheral surface of the elastic member 230. Therefore, the inner diameter groove 241 of the elastic member 230 is seated on a seating portion 239 protruding from the outer peripheral surface of the small diameter portion 217 of the bush body 210 in a diameter direction so that the bush body 210 is assembled with the elastic member 230.

Therefore, it is possible to reduce the area where the elastic member 230 is in contact with the inner peripheral surface of the rack housing 137 and to improve the rigidity of the elastic member 230, thereby preventing the elastic member 230 from being caught in the rack housing 137 during the assembling of the bush body 210 with the rack housing 137. Further, it is possible to prevent the outer peripheral surface of the elastic member 230 from sliding in the axial direction during the compress of the elastic member 230 against the rack housing 137, thereby preventing the increase of the sliding resistance between the rack bar 140 and the rack bush 200.

As described above, referring to FIG. 5 together with FIG. 1, the rack bush includes the rack housing 137 of which the inner surface is assembled with the rack bush and the rack bar 140 is teeth-assembled with the pinion and supported by the inner peripheral surface of the rack bush to convert the rotational movement of the steering shaft 115 into the linear movement while reciprocating in the rack housing 137, to construct the rack pinion type steering apparatus for a vehicle.

Accordingly, the present invention having the above structure and shape has an effect of smoothly supporting the load in the axial direction and the vertical direction of the rack bar, thereby reducing abnormal abrasion of the rack bush, reducing the rattle noise caused by the external force transferred through the rack bar during the movement of the rack bar, and preventing the damage of the rack bar and the pinion shaft through distributing the load by outside impact.

In the above description, even though it is described that every constructional element in the embodiment of the present invention is operated through assembling with each other, the present invention is not necessarily limited to the embodiment. That is, at least one constructional element can be selectively assembled for operation within a range of the object of the present invention.

Further, the terms 'include', 'construct', or 'have' used in the above description have a meaning of including the corresponding constructional element as long as there is no specific contrary description. Therefore, it should be interpreted as further including another constructional element, not to exclude another constructional element. Every term including a technical or scientific term has an identical meaning that is generally understood by those skilled in the art if it is not differently defined. The general terms, such as a term defined in the dictionary, should be interpreted as the meaning according to a contextual meaning of the related technology, and should not be interpreted as an ideal or excessively formal meaning as long as they are not obviously defined in the present invention.

Although an exemplary embodiment of the present invention has been described for illustrative purposes, those skilled in the art will appreciate that various modifications, additions and substitutions are possible, without departing from the scope and spirit of the invention as disclosed in the accompanying claims. While the present invention has been shown and described with reference to certain exemplary embodiments thereof, it will be understood by those skilled in the art that various changes in form and details may be made therein without departing from the spirit and scope of the invention as defined by the appended claims. Therefore, an exemplary embodiment of the present invention has not been described for limiting purposes so that the scope and spirit of the invention may not be limited by the exemplary embodiment thereof. Accordingly, the scope of the invention is not to be limited by the above embodiments but by the claims and the equivalents thereof.

The invention claimed is:

1. A rack bush, comprising:
a bush body shaped like a hollow pipe, of which an outer peripheral surface is assembled with an inner side of a rack housing and an inner peripheral surface is assembled with a rack bar, the bush body comprising at least one stepped portion, by which the outer peripheral surface of the bush body has multiple outer diameters decreasing from one side end to another side end, so that the bush body is supported by the rack bar and the rack housing and maintains rigidity, at least one first slit formed by incising said one side end in an axial direction, and at least one second slit formed by incising said another side end in the axial direction and being spaced apart from the first slit, said at least one first slit and said at least one second slit being misaligned to each other; and
an elastic member having an annular shape and being in close contact with the outer peripheral surface of the bush body,
wherein said at least one first slit includes a first end at said one side end and a second end in the axial direction of the bush body, and
said at least one first slit extends in portions of the bush body in which the multiple outer diameters only decrease from the first end to the second end.

2. The rack bush as claimed in claim 1, wherein the stepped portion of the bush body comprises:
a large diameter portion assembled with and supported by the rack housing and a small diameter portion of which an outer peripheral surface is assembled with the elastic member, or
a large diameter portion assembled with and supported by the rack housing, a middle diameter portion having stepped outer diameters decreasing from the large diameter portion, and a small diameter portion having stepped outer diameters decreasing from the middle diameter and an outer peripheral surface assembled with the elastic member.

3. The rack bush as claimed in claim 2, wherein said at least one first slit is formed by incising an end from the large diameter portion to a part of the small diameter portion so that said at least one first slit is opened in an end direction of the large diameter portion.

4. The rack bush as claimed in claim 2, wherein said at least one second slit is formed by partially incising an end of the small diameter portion in an axial direction while leaving a part of the small diameter portion so that said at least one second slit is opened toward the small diameter portion.

5. The rack bush as claimed in claim 2, wherein the bush body comprises an enlarged diameter portion in an inner peripheral surface of the bush body, in which an inner diameter of the enlarged diameter portion is enlarged from the middle diameter portion to the large diameter portion.

6. The rack bush as claimed in claim 5, wherein the enlarged diameter portion being inclined from the middle diameter portion to the large diameter portion.

7. The rack bush as claimed in claim 1, wherein the elastic member has an inner diameter smaller than an outer diameter of the bush body and a width in an axial direction of the elastic member larger than a thickness in a diameter direction of the elastic member.

8. The rack bush as claimed in claim 1, wherein the elastic member comprises at least one protrusion inserted into said at least one first slit or said at least one second slit on an inner peripheral surface of the elastic member.

9. The rack bush as claimed in claim 1, wherein the elastic member comprises an outer diameter groove formed at an outer peripheral surface of the elastic member in a diameter direction.

10. The rack bush as claimed in claim 1, wherein the elastic member comprises inclined surfaces at both ends of an outer peripheral surface of the elastic member.

11. The rack bush as claimed in claim 1, wherein the elastic member comprises an inner diameter groove formed at an inner peripheral surface of the elastic member in a diameter direction so that the elastic member is seated on a seating portion protruding from an outer peripheral surface of the bush body in a diameter direction.

12. A rack pinion type steering apparatus for a vehicle, comprising:
a rack housing assembled with a rack bush at an inner side of the rack housing; and
a rack bar supported by an inner peripheral surface of the rack bush to reciprocate in the rack housing,
in which the rack bush comprises:
a bush body shaped like a hollow pipe, of which an outer peripheral surface is assembled with an inner side of a rack housing and an inner peripheral surface is assembled with a rack bar, the bush body comprising at least one stepped portion, by which the outer peripheral surface of the bush body has multiple outer diameters decreasing from one side end to another side end, so that the bush body is supported by the rack bar and the rack housing and maintains rigidity, at least one first slit formed by incising said one side end in an axial direction, and at least one second slit formed by incising said another side end in the axial direction and being spaced apart from the first slit, said at least one first slit and said at least one second slit being misaligned to each other; and
an elastic member having an annular shape and being in contact with the outer peripheral surface of the bush body,
wherein said at least one first slit includes a first end at said one side end and a second end in the axial direction of the bush body, and
said at least one first slit extends in portions of the bush body in which the multiple outer diameters only decrease from the first end to the second end.

13. The rack pinion type steering apparatus for the vehicle as claimed in claim 12, wherein the stepped portion of the bush body comprises a large diameter portion assembled with and supported by the rack housing and a small diameter portion of which an outer peripheral surface is assembled with the elastic member, or a large diameter portion assembled with and supported by the rack housing, a middle diameter portion having stepped outer diameters decreasing from the large diameter portion, and a small diameter portion having stepped outer diameters decreasing from the middle diameter and an outer peripheral surface assembled with the elastic member.

14. The rack pinion type steering apparatus for the vehicle as claimed in claim 13, wherein said at least one first slit is formed by incising an end from the large diameter portion to a part of the small diameter portion so that said at least one first slit is opened in an end direction of the large diameter portion, and said at least one second slit is formed by partially incising an end of the small diameter portion in an axial direction while leaving a part of the small diameter portion so that said at least one second slit is opened toward the small diameter portion.

15. The rack pinion type steering apparatus for the vehicle as claimed in claim 13, wherein the bush body comprises an enlarged diameter portion in an inner peripheral surface of the bush body, in which an inner diameter of the enlarged diameter portion is enlarged from the middle diameter portion to the large diameter portion, and the enlarged diameter portion being inclined from the middle diameter portion to the large diameter portion.

16. The rack pinion type steering apparatus for the vehicle as claimed in claim 12, wherein the elastic member has an inner diameter smaller than an outer diameter of the bush body and a width in an axial direction of the elastic member larger than a thickness in a diameter direction of the elastic member.

17. The rack pinion type steering apparatus for the vehicle as claimed in claim 12, wherein the elastic member comprises at least one protrusion inserted into said at least one first slit or said at least one second slit on an inner peripheral surface of the elastic member.

18. The rack pinion type steering apparatus for the vehicle as claimed in claim 12, wherein the elastic member comprises an outer diameter groove formed at an outer peripheral surface of the elastic member in a diameter direction.

19. The rack pinion type steering apparatus for the vehicle as claimed in claim 12, wherein the elastic member comprises inclined surfaces at both ends of an outer peripheral surface of the elastic member.

20. The rack pinion type steering apparatus for the vehicle as claimed in claim 12, wherein the elastic member comprises an inner diameter groove formed at an inner peripheral surface of the elastic member in a diameter direction so that the elastic member is seated on a seating portion protruding from an outer peripheral surface of the bush body in a diameter direction.

* * * * *